April 1, 1941. P. W. NEFF 2,237,159
TRANSMISSION
Filed June 28, 1938 4 Sheets-Sheet 3

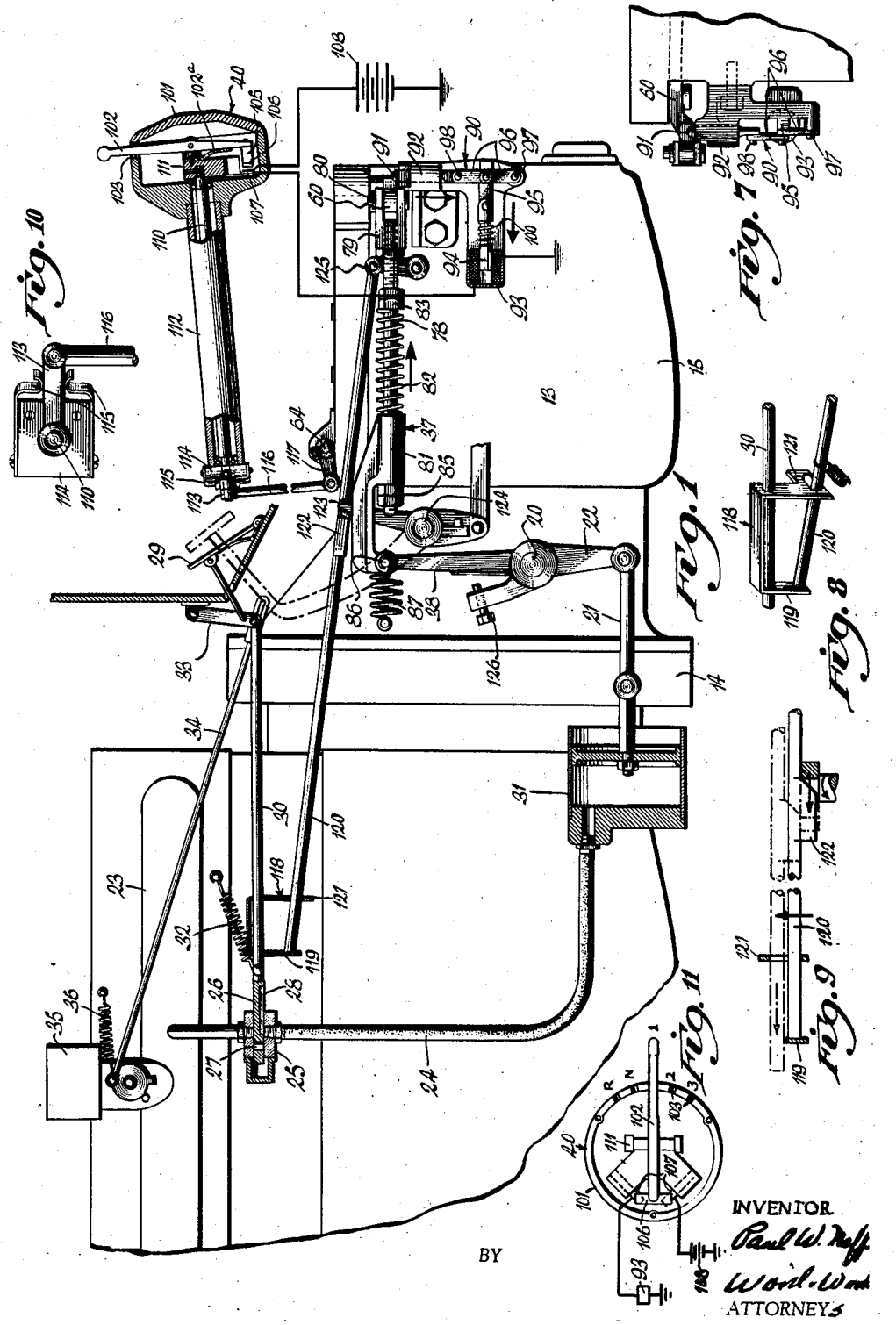

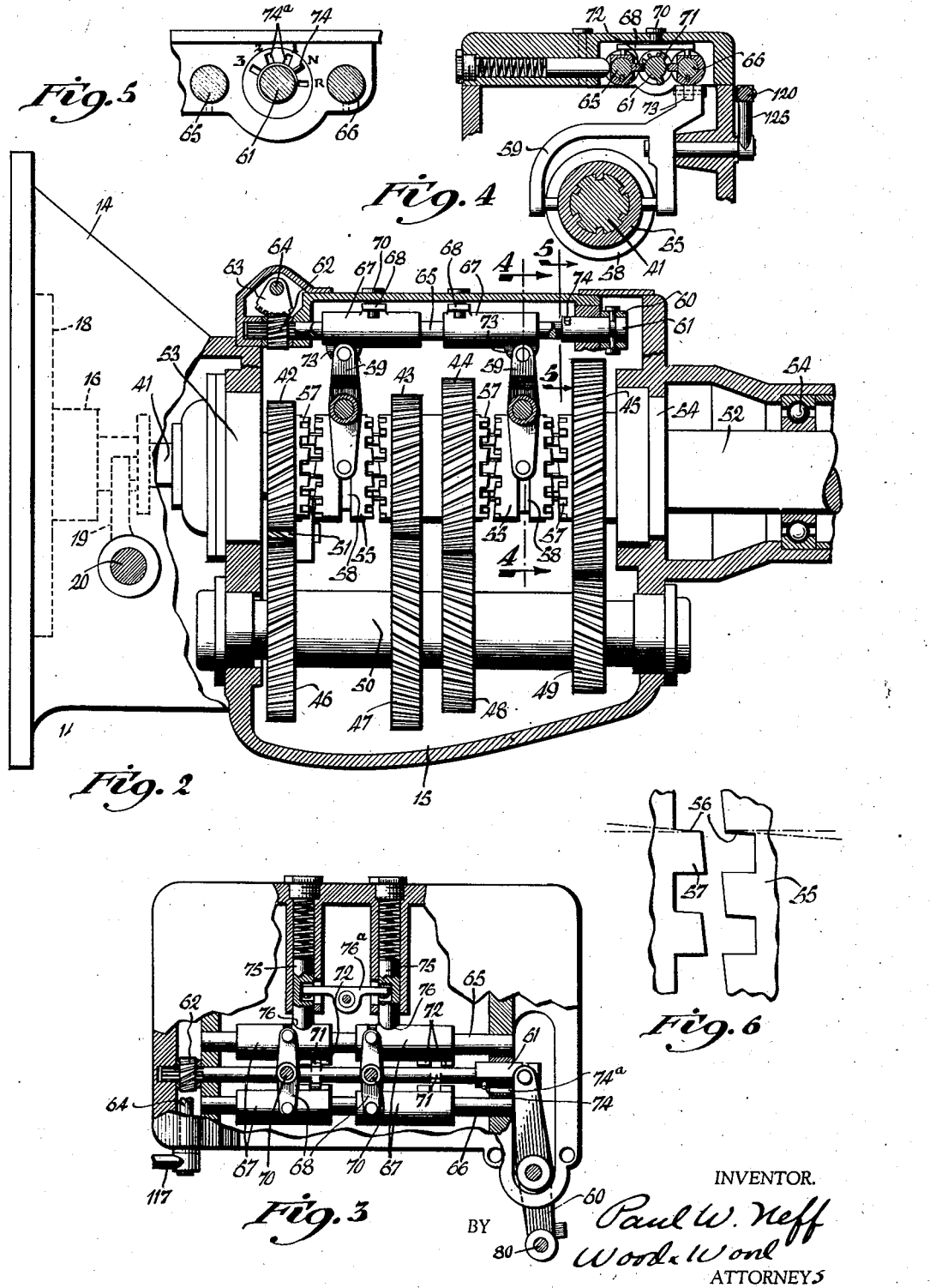

INVENTOR.
Paul W. Neff
BY
Wood & Wood
ATTORNEYS

April 1, 1941.  P. W. NEFF  2,237,159
TRANSMISSION
Filed June 28, 1938  4 Sheets-Sheet 4

INVENTOR.
Paul W. Neff
BY
Wood & Wood
ATTORNEYS

Patented Apr. 1, 1941

2,237,159

UNITED STATES PATENT OFFICE 2,237,159

TRANSMISSION

Paul W. Neff, New Kensington, Pa.

Application June 28, 1938, Serial No. 216,313

19 Claims. (Cl. 192—3.5)

This invention relates to transmissions and is particularly directed to improvements in control systems for semi-automatic speed change gear transmissions for automobiles or the like. The transmission is of the class in which gear changes are manually selected by the operator, but the actual shifting of the gears is accomplished automatically by the control system, or in conjunction with acceleration and deceleration of the motor. The apparatus operates in combination with a clutch which disengages automatically for selecting and meshing the gears and which re-engages after the shift is made.

In the control system of this invention, the clutch is vacuum operated for automatic control by the action of the accelerator pedal. The clutch may be either the conventional type operated by a vacuum device or may be a centrifugal clutch operating in conjunction with a vacuum device. In either case the clutch operates automatically to disengage upon release of the accelerator pedal for gear shifting, therefore, eliminating the use of a clutch pedal. The apparatus automatically shifts the transmission to neutral when the accelerator pedal is released and a remote gear selector actuated for a gear change. When the accelerator is again depressed, the selected gear is meshed and the clutch reengaged automatically.

When driving in high gear, it is undesirable to disengage the clutch and gears each time the accelerator is released, since the compression of the engine affords the driver better control of the car.

The present invention provides a semi-automatic transmission system having a finger-tip remote control device, an accelerator responsive clutch and gear actuator, and an automatically operated mechanism for latching the transmission in gear at all times except when a gear shift is contemplated. The clutch and gear actuator is common to both the transmission and the clutch for disengaging both units upon release of the accelerator. Disengagement of gears, however, occurs only when the latching mechanism is actuated under the control of the remote control device.

It has been the primary objective of this inventor to provide an improved semi-automatic transmission system which more nearly meets all driving conditions and therefore provides safer and easier operation of the car. The transmission system is controlled by a remote finger-tip gear selector which provides automatic effortless control of clutch and gears and, at the same time, the complete flexibility of a manually operated transmission system.

Another objective of the present inventor has been to provide an improved semi-automatic transmission control system having a simplified automatic device for positively locking the transmission and clutch in engagement in high gear, irrespective of the operation of the accelerator pedal, so as to permit the use of the engine for braking the car.

It has been another objective of the inventor to provide a control system of the above indicated character embodying a centrifugal clutch in conjunction with a power operated clutch throw-out mechanism in order to facilitate smooth starting and stopping of the car. In stopping the car, the clutch and transmission automatically remain in positive driving connection with the motor, until the car is almost at a standstill, at which time the clutch disengages and the motor continues to idle.

It has been another objective to provide a transmission control system having electrically operated devices to control the action of a vacuum operated shifter unit, and thus provide the advantages of electrical control, and yet avoid the excessive battery drain entailed by directly energizing the shifting mechanism electrically.

Further objectives and advantages of the invention will be more fully set forth in a description of the drawings, in which:

Figure 1 is a fragmentary side elevation, partially in section, of the transmission control system of the present invention, in position with the gears meshed and the clutch engaged.

Figure 2 is a fragmentary side view taken partly in section, of a transmission adapted to be operated by means of the present control system.

Figure 3 is a top plan view of the transmission casing with parts broken away for illustrating the gear selector and shifter mechanism.

Figure 4 is a sectional view taken on line 4—4 Figure 2.

Figure 5 is a sectional view taken on line 5—5 of Figure 2.

Figure 6 is an enlarged detailed view illustrating a portion of the clutch teeth of the transmission.

Figure 7 is a fragmentary view illustrating the electrically operated latching devices of the transmission control.

Figure 8 is a fragmentary perspective view showing the latching finger of the suction valve operating control rod.

Figure 9 is a diagrammatic view of the latching finger and the control rod shifter.

Figure 10 is a detailed view illustrating the yieldable connection of the gear selector linkage.

Figure 11 is a detailed view of the gear selector unit which is mounted in the driver's compartment.

Figure 12:
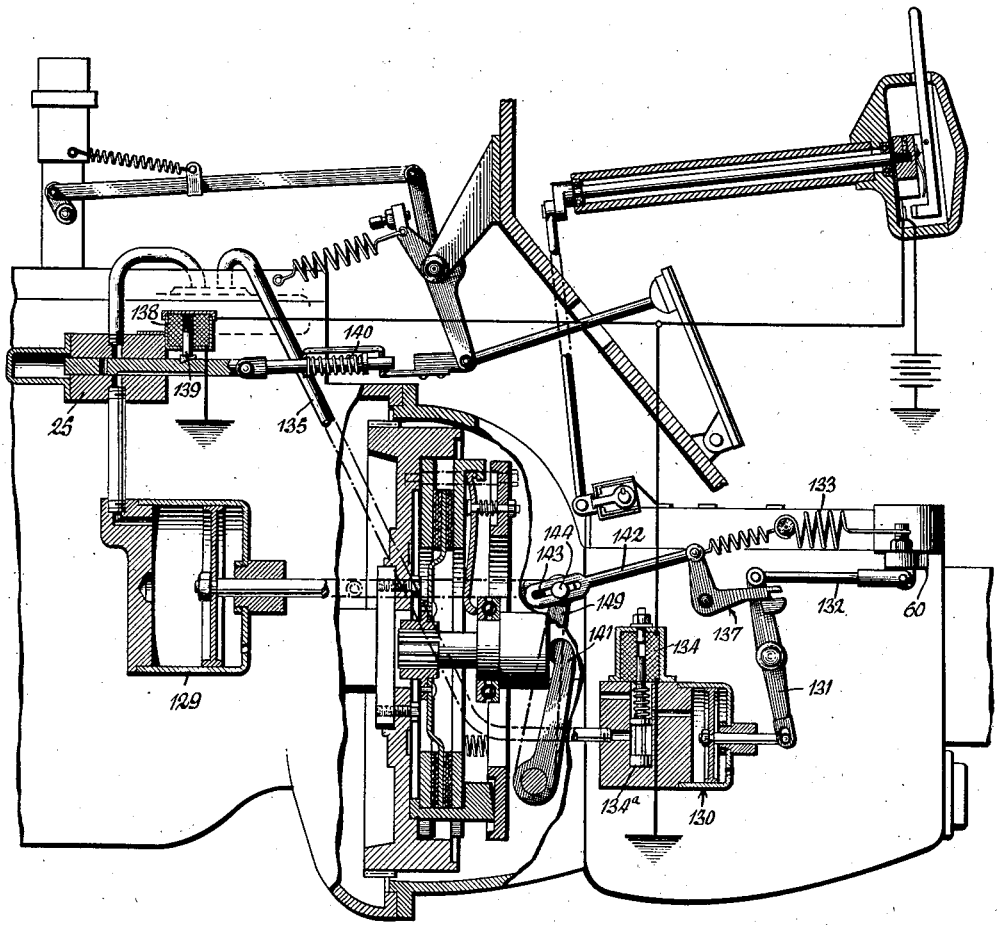
Figure 12 is a side view, partially in section, taken similar to Figure 1 and illustrating a modified arrangement of the present invention.

The apparatus of the present invention is disclosed in conjunction with the speed change gear transmission of an automobile. The transmission is mounted in a housing 13 which extends back from the motor of the automobile and includes a fly wheel or clutch compartment 14 and a gear compartment 15. The clutch 16 of this embodiment of the invention may be of any conventional friction disk type as commonly used in automobiles and for this reason is not illustrated in detail.

In the present form the clutch includes a throw out yoke 19 mounted on a cross shaft 20. (See Fig. 2.) The clutch is mounted in the fly wheel of the engine and is operated automatically by means of a vacuum device 31. The piston of the vacuum device is in connection with the cross shaft 20 by means of a link 21 pivoted at the lower end of an operating arm 22 which is secured to the cross shaft.

The cylinder of the vacuum device is connected to the intake manifold 23 of the engine by means of a vacuum line 24. A control valve 25 in the vacuum line 24, controls the operation of the clutch. The valve 25 includes a plunger 26 which is provided with a diametric cross passageway 27 and a longitudinal bypass slot 28. The plunger is in connection with the accelerator 29 by means of a rod 30. The clutch therefore operates automatically from the accelerator and manual control clutch means are not required although this may be provided if desired.

When the accelerator is in released position, the passageway 27 is in alignment with the vacuum line 24 to connect the vacuum cylinder 31 with the manifold and disengage the clutch. When the accelerator is in the depressed position, as shown in Figure 1, the bypass slot 28 is in alignment with the line 24 to admit atmospheric pressure to the vacuum device thereby permitting the clutch to engage. A tension spring 32 returns the valve to clutch disengaging position upon release of the accelerator.

The accelerator pedal is in connection with the rod 30 by means of a pivoted arm 33 which includes the conventional actuating rod 34 extended to the carburetor 35. The rod 34 is in operating connection with the throttle valve of the carburetor. A tension spring 36 closes the throttle valve when the accelerator is released.

The vacuum unit 31, in addition to operating the clutch, also actuates the gear shifting mechanism. The gear shifting is performed by a linkage arrangement generally indicated at 37. The shifting linkage is in connection with an upwardly extended lever 38 which is loosely pivoted on the cross shaft 20. Clutch disengaging movement of the vacuum unit is transmitted through lever 38 to the transmission to actuate the linkage 37 in gear disengaging direction at the same time that the clutch is disengaged.

The apparatus includes a gear selecting arrangement indicated generally at 40. Manual actuation of the gear selecting mechanism sets up the apparatus for the shifting of a gear. The shifting operation occurs automatically when the accelerator pedal is depressed.

*Transmission*

The transmission, as illustrated, contains a conventional arrangement of gears providing three forward speeds and a reverse. The gears are of the constant mesh type and four sets of constantly meshing gears are included for providing three forward speeds and a reverse. A drive shaft 41 extends rearwardly from the clutch longitudinally of the transmission housing and carries the driving gears 42, 43, 44 and 45 freely rotatably thereon. These gears are held against axial movement by any conventional means (not shown). The other gears of the respective sets, namely, 46, 47, 48 and 49 are fixed on the countershaft 50. The reverse speed set, namely gears 42 and 46 includes a reverse gear 51 for reversing the direction of rotation.

The large gear 45 at the rear end of the shaft, although loose with respect to the drive shaft, is non-rotatably secured to the propeller shaft 52. The drive shaft is supported at the forward end in a bearing 53 and at the rear end in an axial socket (not shown) in the forward end of the propeller shaft. Bearings 54, 54 support the forward end of the propeller shaft 52. Thus shafts 41 and 52 may rotate freely independently.

The gears 42, 43, 44, and 45 on the driving shaft 41 are adapted to be coupled individually to the shaft by means of coupling devices. These gears 42, 43, 44, and 45 as considered in their longitudinal arrangement, are controlled or arranged in pairs, namely a forward and a rear pair with a coupling device disposed between the gear elements of each pair. The coupling devices consist in each instance of a coupling block or collar 55 in splined connection with the drive shaft 41 between the particular pair of gears. The collars are provided with coupling teeth and are adapted to engage in driving relationship with adjacent teeth 57 formed on the hubs of the gears. Each collar is provided with an annular groove 58 which is engaged by a shifter yoke 59 adapted to shift the collar into driving engagement with the selected gear.

Since the gears are loosely journaled and the clutch collars are in splined connection on the shaft 41, shifting of a clutch collar into engagement with the clutch teeth of a gear results in establishing a driving connection between the drive shaft 41 through the collar to the selected gear.

It will be observed that when both of the clutch collars are in position centered between the gears as in Figure 2, the transmission is in neutral. When the forward clutch collar is shifted forwardly into engagement with the gear 42, the transmission is in reverse gear. The drive then takes place through the gear 42, the idler gear 51, the gear 46 on the countershaft and from the small gear 49 at the rearward end of the countershaft to the large gear 45 secured on the propeller shaft 52. This gear is in constant and direct connection with the rear axle of the car through the propeller shaft 52.

When the forwardly disposed coupling collar is shifted rearwardly, a driving connection is established through the collar, the gear 43, the gear 47 on the countershaft, and then to the rear axle as disclosed above. The transmission at this time is in low gear. The other coupling collar, when shifted forwardly, results in second speed through the gears 44 and 48. When the other or rearmost coupling collar is shifted rearwardly, a direct connection is established between the driving shaft 41 and the gear 45 and the transmission at this time is in high gear.

Gear coupling mechanism

The gear shifting mechanism is actuated by a shifter lever 60 at the rear end of the transmission casing. The lever 60 is bifurcated at its inner end (see Figure 3) and has a yoke connection to a translatable selector rod 61 mounted in the transmission casing. The forward end of the rod 61 is loosely and slidably journaled in the transmission housing and includes a small gear 62 slidably splined on the rod. The gear 62 is in mesh with a gear sector 63, secured on a cross shaft 64 which is rotated by the selector device 40 in the driver's compartment. The selecting movements are transmitted to the selector rod through the gear sector 63 and gear 62 to rotate the shaft 61 and select the gears. The actual shifting is done by longitudinal translation of the rod 61 as permitted by the splined connection to the gear 62.

Longitudinal movement of the selector rod is transmitted to the coupling collars 55, 55 in the following manner. A pair of shafts 65 and 66 are secured in the casing adjacent to and parallel with the rod 61, one at each side thereof. Each of the shafts 65 and 66 carries a pair of shifter sleeves 67 longitudinally translatable on the shafts. The sleeves are coupled together for motion in opposite directions by means of centrally pivoted levers 68.

Each lever is connected to respective sleeves by means of pins at the outer ends of the levers. These pins are engaged in slots formed in the sleeves. Each lever is pivoted at its center upon a pin 70. The selector rod 61 is provided with four radially disposed lugs 71 one for each speed change including reverse. These lugs 71 are arranged in pairs, each pair being located between a pair of adjacent shifter sleeves 67. Each shifter sleeve is provided with a pair of spaced lugs 72 between which the lugs or spurs 71 are adapted to engage so as to transmit the longitudinal shifting motion of the selector rod to a pre-selected sleeve.

The coupling blocks are connected to the shifter sleeves by means of the yokes 59. The upper end of each yoke is pivotally connected to a lug 73 of the particular shifter sleeve. The yokes 59 being centrally pivoted, provide rocking lever connections between the sleeves 67 and the coupling collars 55.

In selecting the desired gear, the selector rod is rotated to engage one of the spurs or lugs 71 between a pair of the lugs 72 of the particular sleeve to be shifted. The rotary motion is transmitted through the gears 62 and 63 upon actuation of the selector lever in the driver's compartment, the structure and operation of which will be subsequently described.

The end of the selector rod 61 adjacent the yoke connection of the shifter lever is provided with an arrangement to prevent rotation of the rod when any one of the gears is coupled. The arrangement consists of a radial pin 74 projected from the rod and adapted to engage in any one of a series of five radial slots 74a formed in a bushing at the end wall of the transmission casing. The slots correspond with the angular position assumed by the pin 74 as the selector rod is revolved for each of the four gear changes and neutral. The longitudinal translation of the rod when one of the gears is coupled engages the pin in the slot corresponding to the gear selecting position of the rod. In the event that no gear is coupled the pin is engaged in the neutral slot 74a. The rod therefore cannot be rotated for the next gear selection until it is first shifted longitudinally inwardly to uncouple and move the shifter lugs or spurs 71 into alignment with the lugs 72.

The transmission is provided with an interlocking device to prevent more than one set of gears from being engaged at a given time. This device comprises a pair of spring pressed detent plungers 75 adapted to engage in notches 76 of the shifter sleeves. The detent plungers are interconnected by means of a centrally pivoted lever 76a. The clearances between the ends of the lever 76a and the respective plungers is sufficient to permit one of the plungers to move outwardly to clear the notch as a particular selector sleeve is shifted. The interlocking lever 76a is then in locking engagement with the other plunger and blocks the adjacent shifter sleeve against longitudinal shifting, thus preventing movement of more than one of the sleeves at a time.

As above described, the shifting of the gears is accomplished by the shifting lever 60. This lever is actuated by the linkage 37 upon operation of the vacuum device 31. It will be evident from the foregoing that the clutch disengaging movement of the vacuum cylinder will be transmitted not only to the clutch, but also to the gear shifting lever 60 each time the accelerator pedal is released. When the transmission is in high gear, latching devices come into play to prevent clutch and gear disengagement, unless it is desired to coast or bring the car to a stop.

The shifting linkage 37 is compressible and the shifting lever 60 at its outer end is provided with an electrically operated latching arrangement which under certain conditions locks the shifting lever 60 against disengaging movement. The link 37 includes a push rod 78 having a clevis member 79 at its rear end which is pivoted to the outer end of the shifter lever 60 as at 80. The forward end of the push rod is slidably mounted in a connecting sleeve 81. The rod carries a compression coil spring 82 disposed between the sleeve 81 and a pair of adjusting nuts 83. The forward end of the rod 78 is provided with a pair of nuts 85 which serve to hold the sleeve 81 against the action of the spring 82. The forward end of the connecting sleeve 81 includes a bifurcated extension to accommodate a pivotal connection, as at 86, to the actuating arm 38.

A tension coil spring 87 is secured to the sleeve 81 and has its opposite end secured to the transmission housing. The spring 87 tends to draw the assembly to its gear engaging position as shown in Figure 1.

The electrically operated locking device indicated generally at 90 is disposed at the outer end of the shifting lever 60 and serves to lock the lever in gear engaging position, as shown in Figure 1. It will be noted from a study of the arrangement that rearward movement of the gear shifting lever 60 is blocked when the locking device is in operative position. Therefore, simultaneous disengagement of the clutch and gears can occur only when the locking device is in inoperative or retracted position. With the device in locking position, as shown in Figure 1, clutch disengaging movement of the lever 22 and 38 will compress the spring 82 without imparting any movement to the shifting lever 60. However, as soon as the locking device is unlatched or retracted, the shifter lever 60 will snap rearward to disengage the gears, by virtue of the spring 82. The operation of the locking device is controlled electrically automatically upon actuation of the gear selector lever as will be hereinafter described.

The locking device 90 comprises a locking pin 91 slidably mounted in a bracket 92. The plunger or locking pin 91 is actuated by means of the solenoid 93. The solenoid includes a plunger 94 having at its outer end, a link 95 pivoted to the joint of a pair of toggle levers 96. The lower end of the toggle is pivoted at 97 to the solenoid bracket 92 and the upper end at 98 to the locking plunger 91. The solenoid plunger 94 carries a coil spring 100 under compression adapted to position the plunger 91 in locking position as shown. When the solenoid is energized, the plunger 94 is drawn inwardly and this movement is transmitted by means of the toggle to the locking plunger 91 to retract the upper end of the plunger out of the path of rearward movement of the shifting lever 60. The solenoid is energized upon actuation of the gear selecting lever in the driver's compartment prior to the time the actual gear selecting movement is made.

Selector means

The selector mechanism comprises a housing element 101 having an indexed or notched edge and a selector lever 102 adapted to be swung in an arc and relative to the notches 103. The manipulating end of the swinging lever extends outwardly of the casing for manual operation. The inner end of the selector lever carries an insulated block 105 which includes a contact connector bar 106 adapted to contact with a pair of switch blades 107. One of the switch blades 107 is in electrical connection with the solenoid 93 and the other blade is in connection with the battery 108 of the car.

The swinging lever is pivoted on an insulated block 111 fixed on a gear selecting shaft 110. The shaft is journaled in bearings at the upper and lower ends of the supporting sleeve 112 of the selector assembly. The shaft 110 at its lower end includes a crank 113 and adjacent the crank, a block 114 and a pair of flat springs 115. The springs engage the respective sides of the crank arm and are secured to the block which in turn, is fixed on the shaft 110. The crank 113 is loosely mounted on the shaft 110 and gear selecting movements of the lever 102 are transmitted to the crank arm through the springs 115. The outer end of the crank 113 is pivoted to a link 116, the other end of which is connected to a crank 117 fixed on the gear selecting shaft 64.

The notches 103 are positioned for determining the proper amount of movement to select the various gears. These are five notches for three forward speeds, reverse, and neutral. A slot is provided adjacent the notches for permitting limited rocking and swinging of the lever. In selecting a gear, the lever necessarily must be lifted to clear the notch in which it is engaged prior to swinging movement. The lifting movement connects the contacts 107, thus energizing the solenoid 93. The lever is provided with a flat spring 102a which serves to hold the lever in the particular notch and clear of the contact members.

From the foregoing, it will be evident that upon release of the accelerator pedal, the operation of the vacuum unit will disengage the clutch and subsequently operate the link 37 in the direction of gear disengagement. If a gear change is to be made, the lifting of the selecting lever preparatory to making the next shift will energize the solenoid 93 and depress the locking pin, thus permitting the gear shifting lever 60 to be moved rearwardly to gear selecting position. The transmission is then in a condition for changing gears. Movement of the lever to the next notch operates the selector rod in the transmission to select the gear. When the selecting lever is brought to position in the selected notch, the lever will engage the notch and move out of contact with the switch blades. The shifting lever 60 will at this time be in rearward or gear selecting position above the depressed spring urged, locking plunger 91.

When the accelerator pedal is again depressed, the valve 25 will operate to bypass the vacuum line to admit atmospheric pressure to the vacuum cylinder and re-engage the clutch. The spring 87 on the link 37 will then move the link in a forward direction to mesh the selected gear. When the lever reaches its forward position, the latching plunger 91 snaps upwardly under the action of the spring 100 to latch the lever positively in gear.

Each time the accelerator is released, the valve 25 will tend to reestablish the vacuum in the clutch operating cylinder. This, of course, would disengage the clutch each time the accelerator is released. In order to prevent this action, means are provided for holding the valve 25 in clutch engaging position when the transmission is in high gear. This device consists of a clip 118 secured on the valve actuating rod 30. The clip is formed of a U-shaped element having its pair of arms downwardly depending. The forward arm 119 provides an abutment against which a rod 120 bears. The rearward arm of the clip 121 is provided with a laterally disposed slot to support the forward end of the rod 120.

It will be noted on Figures 8 and 9 that the rod is adapted to be moved laterally. The rod 120 is provided with an inclined lug 122 adapted to cooperate with a throw-out arm 123 fixed on the brake shaft 124. The rearwardly extended end of the rod 120 is pivotally connected to a crank arm 125 (see Figure 4) secured on the outer end of the rocking shaft on which is secured the yoke for shifting the coupling element 55 for second and high speeds. As may be seen from a study of Figure 1 showing the transmission in high gear, the rod 120 is in its forward position as shifted by the crank arm 125. The end of the rod 120 therefore contacts the clip 118 to lock the valve 25 in clutch engaging position. The transmission is locked in high gear by the engagement of the plunger 91 against the shifting lever 60 and the clutch is engaged and locked against disengagement by the contact of the rod 120 with the clip 118.

Therefore, when the car is in high gear, it will remain there irrespective of the accelerator position. This, of course, permits the driver in slowing down or descending hills, to utilize the braking effect of the engine by releasing the accelerator. If it is desired to disengage the clutch while in high gear to permit coasting or in coming to a stop, actuation of the brake pedal will dislodge the end of the rod from the arm 119, thus permitting the spring 32 to return the valve to clutch disengaging position. This function will take place automatically whenever the brakes are applied, and automatically the clutch will be disengaged upon coming to a complete stop.

Description of operation

Assuming that the car is at a standstill with the engine not running, the clutch engaged and the selector at neutral, the following operations take place in getting the car in motion. The engine is started and this causes the power device to disengage the clutch. The link 37 will be compressed when the engine is started and the clutch disengaged since lever 60 is latched in neutral position by means of the plunger 91.

Preparing to move the selector lever to low gear, the operator raises the selector lever to clear the notch in which it is engaged. This movement closes the contacts 107 of the switch to energize the solenoid 93. When the solenoid is energized, the plunger 91 is retracted. This action occurs very quickly and the spring 82 of the link 37 immediately moves the shifting lever 60 to gear selecting position. The selecting lever is now moved to position for low gear and when brought to this position, drops into a notch 103. The lever 60 is now in its gear selecting position and the plunger 91 held in depressed position by this lever. Upon swinging the selector lever, the selecting rod 61 in the transmission is rotated to engage the proper sleeve 67 for shifting the sleeve when the shifter lever is moved to gear coupling position.

The operator now depresses the accelerator pedal. This movement is transmitted to valve 25 to bypass or vent the valve, thus causing the clutch to engage and permitting the spring 87 to draw the link 37 forwardly to mesh the selected gear. The selected gear will mesh and the clutch will engage independently and in the proper timing as determined by the pressure of their respective springs, due to the clearance provided between the arm 38 and the stop screw 126.

The car will now be in motion and will continue driving in low gear as long as the accelerator is held down. When the car speed is considered proper, the accelerator is released and the valve will then operate to disengage the clutch.

The transmission will remain in low gear, however, due to the locking action of the plunger 91 and the compressible link 37. When it is desired to shift to second gear, the selector lever is again actuated to energize the solenoid prior to shifting the lever to the next notch. The above described action, of course, will be repeated, the compression spring 82 of the link shifting the transmission to neutral immediately upon raising the selector lever and depressing the locking pin 91. The lever is then dropped into the second speed notch and upon depressing the accelerator pedal, the clutch will again engage and the second gear will be coupled.

It will be borne in mind that during the time these operations are taking place, the rod 120 is in retracted position, so that the valve 25 is free to move to clutch disengaging position each time the accelerator is released.

The apparatus functions in the same manner for the high speed shift. At this time, however, the rod 120 is moved forwardly to engage the stop finger 119, thereby locking the valve 25 in clutch engaging position. The transmission, of course, is shifted and locked in the high speed position, as previously described.

With the engagement of the clutch, the transmission and clutch are locked in positive high speed drive position, and therefore release of the accelerator pedal will have no effect upon the transmission and clutch other than slowing the car in the customary manner.

When it is desired to disengage the clutch with the car in high gear, this is done by slightly depressing the brake pedal to dislodge the rod 120 from the stop finger 119. The spring 32 will then move the valve 25 to clutch disengaging position. It is understood that the accelerator will be in released position at this time. Therefore, the valve may be shifted.

Modified arrangement

Referring to Figure 12, the apparatus employs a selector mechanism and speed change transmission essentially the same as those already disclosed. The control or shift system includes a vacuum operated clutch actuating device, an accelerator actuated valve and a vacuum operated, electrically controlled gear shifting lever.

In the present example, however, the clutch is of the centrifugal automatic type, having a plurality of centrifugal masses adapted to engage the clutch when the engine is brought to clutch engaging speed. The clutch, in addition to the centrifugal actuation, is operated for disengagement by means of the vacuum operated disengaging device. In normal operation the clutch is disengaged by the vacuum device and engaged by centrifugal action. The centrifugal action provides somewhat better starting characteristics than is otherwise possible in semi-automatic transmission systems. In shifting gears when the car is in motion, the clutch is disengaged by the vacuum device upon release of the accelerator. If the gear selecting is done quickly the clutch will be reengaged by the vacuum device before the engine speed is sufficiently reduced to cause centrifugal disengagement of the clutch. Therefore, the centrifugal action of the clutch is normally effective only in starting the car from a standstill.

In this example, the gear shifting lever 60 is actuated for disengaging the gears by means of the electrically controlled vacuum operated device indicated at 130. The piston of the device is connected to the shifting lever 60 by means of a lever 131 and a link 132. The lever 60 is pulled into gear coupling position by means of a spring 133 attached to the lever. The gear shifting lever actuating device 130 is controlled by means of a solenoid 134 and a slide valve 134a.

When the selector lever is lifted preparatory to selecting a gear, the solenoid 134 is energized to move the valve 134a upwardly to establish a passageway from the cylinder through the valve chamber to the vacuum line 135 which is connected to the intake manifold of the motor. It may be seen, therefore, that lifting the selector lever will cause the device 130 to move the shifter lever to gear selecting position. The lever will be locked in this position by means of an interlock device 137.

The clutch control valve 25 is provided with a solenoid 138, having a latching plunger 139 adapted to engage a notch in the valve plunger for latching the valve in clutch engaging position. The solenoids 138 and 134 are in electrical connection with the selector unit and are energized simultaneously when the selector lever is raised.

If the accelerator is released at this time, the valve plunger will move to clutch disengaging position under the influence of the spring 140 and the clutch will disengage. The interlocking device 137 will hold the transmission in neutral only so long as the clutch is engaged.

When the valve 25 moves to clutch disengaging position, the vacuum unit 129 will come into play to move the clutch actuating arm 141 forwardly to disengaged position. A link 142 is provided between the clutch actuating lever 149 and the interlock lever 137 and has an elongated slot 143 engaged by a pin 144 on the lever 149. When the clutch is being disengaged, the pin 144 moves forwardly in the slot until it reaches the end of the slot at which time the link 142 is moved forwardly to trip the interlock 137. The clutch disengaging unit has a relatively long stroke of travel, consequently there will be a few moments delay during which time the final movement of the selecting lever occurs. By the time the clutch disengagement is complete, the gear has been selected and the interlock has been tripped to permit the shifter lever to be actuated by the spring 133 to couple the selected gear. After the selecting lever has reached the selected notch, the electrical contact will be broken causing the solenoids to be de-energized, thus permitting the gear shifter piston to move to its gear coupling position under spring influence. The solenoid on the valve 25 also will have been de-energized at this time allowing the detent plunger to drop into engagement with the valve plunger. When the accelerator is again depressed, the valve plunger will be latched in clutch engaging position as shown in the drawings. Therefore the clutch remains in engagement independently of the accelerator.

From the foregoing description it will be seen that the clutch and transmission are disengaged each time the selector lever is manipulated with the accelerator released. This arrangement in conjunction with the centrifugal clutch eliminates the necessity of operating the brake pedal for disengaging the clutch when bringing the car to a stop. In the present case, the centrifugal action of the clutch will cause it to disengage automatically just before the car is brought to a complete stop, the engine then running at idling speed.

In the present example, the transmission shifting means and the clutch are operated by separate units rather than the common actuating means, as shown in the preceding form. The shifting of the transmission to neutral is accomplished by energizing a solenoid which in turn opens the valve to the vacuum line for causing the shift to neutral by vacuum. In the form illustrated in Figure 1 the actual gear uncoupling movement is imparted by a spring, the transmission being locked in gear, and released by a solenoid which is energized upon manipulation of the selector lever. In both instances, raising the selector lever moves the transmission to neutral.

Since the vacuum operated clutch actuating device is not operative except when shifting, the centrifugal clutch is necessary for clutch disengagement when the car is nearing a stop. For slow starting the centrifugal clutch again comes into action, but for quick starting, the engine is accelerated quickly and the centrifugal force acts before the vacuum device, and the clutch engages at a high engine speed. In this manner the apparatus provides either for quick getaway or for slower starting the apparatus operating automatically in either event.

The interlock device functions upon the same principle as in the former case, that is, the gears cannot be meshed until the clutch is fully disengaged. The long stroke of the clutch power unit requires more time in which to act, whereas the gear shifting unit has a very short stroke. Since the vacuum operated gear shifting device acts very quickly the gears are uncoupled before the clutch becomes fully disengaged and in coupling the gears after a selection has been made, the gears are coupled before the clutch is engaged.

In order to facilitate engagement and disengagement of the teeth, surfaces of the clutch teeth are disposed at certain angles. As detailed in Figure 6, the teeth are tapered, that is to say, the rear faces 56 of the teeth slant with respect to the driving faces in a direction tending to force the two elements apart when the car is driving the engine. The degree of the angle, as indicated by the dot and dash lines, is relatively slight and is designed to reduce the friction and therefore the force required for shifting into neutral when the car is driving the engine. In other words, the teeth are canted to a slight degree to neutralize or balance the separating force and the frictional holding force when the car is driving the engine so that the power required to shift the coupling blocks out of engagement is reduced. The correct angle depends upon factors in the driving force, that is, piston displacement, compression ratio, etc.

*Operation of modified structure of Figure 12*

Assuming that the car is at a standstill with the selector lever at neutral and the motor running, the following operations take place in starting the car.

Since the motor is at idling speed, the centrifugal clutch will be in disengaged position. When the selector lever is lifted preparatory to selecting low gear, the contacts will be closed and the solenoids 134 and 138 will be energized. The control valve 25 will then snap to clutch disengaging position and the transmission shifting valve 134a will operate to shift the transmission to neutral. It will be seen, therefore, that both the clutch and the transmission are in neutral prior to the time that the actual gear selection is made. The lever is now swung to the desired notch to select the gear, as in the previously described manner.

When the lever is dropped into the notch, after the gear is selected, the contacts to the solenoids 134 and 138 will be broken, thus admitting atmospheric pressure to the vacuum devices 129 and 130 and permitting the spring 133 to mesh the gears. Upon depressing the accelerator pedal, the valve 25 will be moved to clutch engaging position, thus permitting the car to be started when the engine speed is increased sufficiently to actuate the centrifugal weights. When this speed is reached, the clutch begins to drive and the car is in motion.

It is to be remembered, that each time the shifter lever is actuated to shift the transmission to neutral, the interlock 137 engages the lug on the lever 131, thus locking the gears in neutral. Therefore, before the gears can be meshed, the clutch controlling vacuum device must be actuated to disengage the clutch and trip the interlock 137, at which time the gears snap into mesh by means of the spring 133. As the accelerator is depressed, the valve 25 comes into play to engage the clutch pneumatically and the transmission will again be in driving connection with the motor as soon as the engine speed is sufficient to engage the clutch centrifugally.

The principle upon which this apparatus functions is that of mechanically disengaging the clutch prior to shifting gears and reengaging the clutch by centrifugal action after the desired gear selection has been made and the clutch reengaged mechanically.

Figure 13:
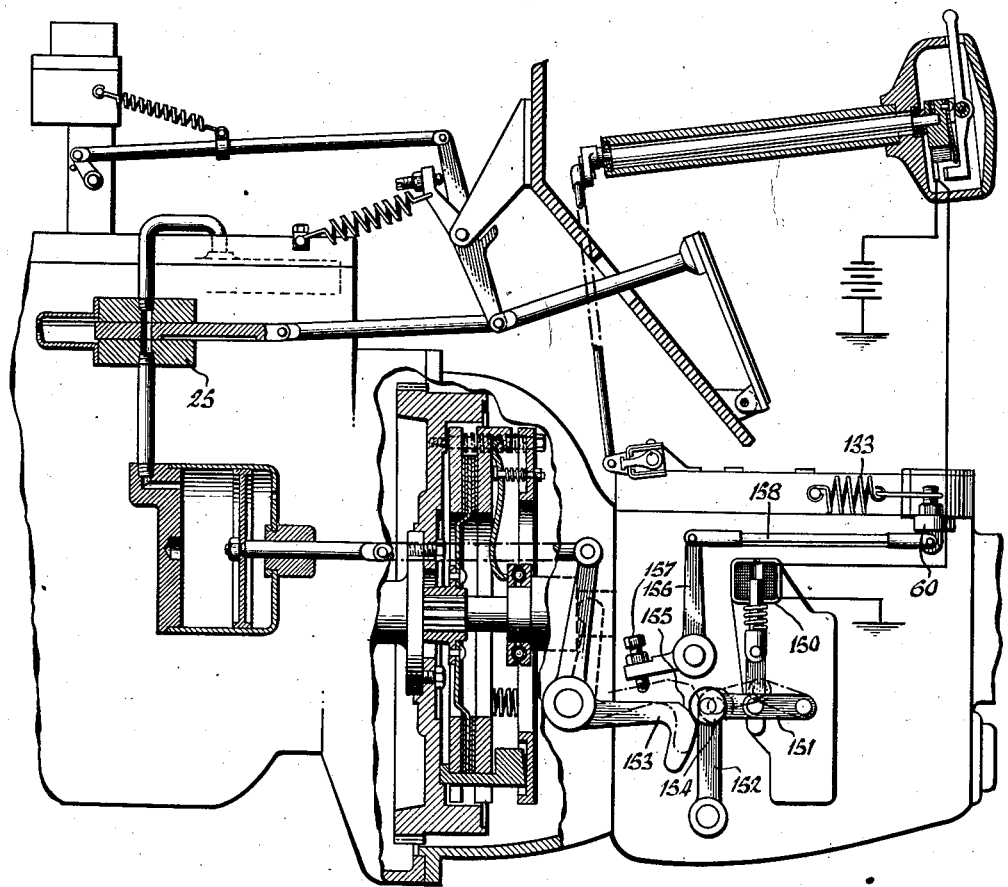
Figure 13 is a view taken similar to Figure 1 but illustrating a modification of the structure.
Figure 14:
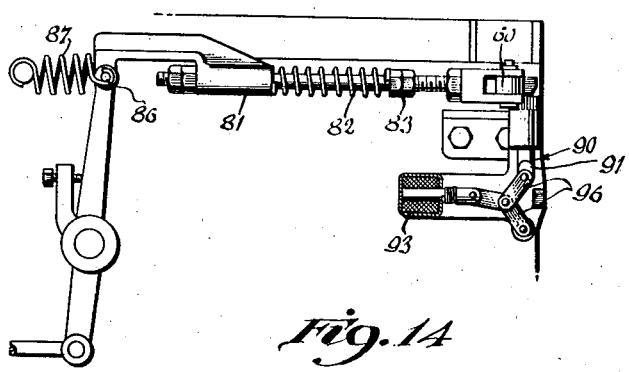
Figure 14 is a detail view of the solenoid operated unlocking mechanism and the compressible shifting link of Figure 1.

*Description and operation of modified structure of Figure 13*

The structure illustrated in Figure 13 incorporates an automatic centrifugal clutch, an accelerator responsive vacuum device to disengage the clutch and gears and a solenoid operated locking means for normally locking the clutch and gears in engagement independently of the accelerator position. In this arrangement the locking mechanism acts directly upon the clutch actuating linkage to hold the clutch in engagement against the disengaging force exerted by the vacuum unit when the accelerator is released. Thus the clutch is locked in engagement directly.

The gear shifting lever is in connection with the clutch disengaging linkage so as to shift the gears to neutral when the vacuum unit disengages the clutch. Normally the shifter lever is held in gear coupling position by means of a spring. Therefore, when the clutch linkage is locked in engaged position, the gears also will be held in coupled relationship.

When the clutch linkage is unlocked and moved to disengaging position, the shifter lever will be actuated against the tension of the spring to shift the gears to neutral. In operation, the solenoid operated locking means prevents disengagement of the clutch and gears except when the selecting lever is lifted out of a notch and the accelerator released.

The centrifugal clutch operates in the usual manner to automatically disengage independently of the control mechanism when the car is brought nearly to a stop.

It will be noted in Figure 13 that the solenoid 150 is arranged in much the same manner as in Figure 1. In the present instance however, instead of a locking pin, the solenoid plunger actuates a lock-out toggle 151 having one link pivoted to the transmission and the other pivoted to a locking arm 152. The locking arm is adapted to swing relative to a rocker arm 153 having an arcuate cam surface adapted to move relative to a roller 154 pivoted at the upper end of the locking arm 152. The upper end of the cam surface terminates at an angular flat surface indicated at 155, adapted to be engaged by the roller 152 to lock the rocker arm in downward or clutch engaging position when the solenoid is in locking position as illustrated in full lines.

It will be apparent, therefore, that the vacuum device cannot operate to disengage the clutch when the solenoid is in deenergized or in locking position. However, when the solenoid is energized by lifting the selector lever, the toggle links will assume the position shown in dotted lines and the roller will move rearwardly and out of engagement with the locking surface 155 to permit movement of the rocker arm. Thus, if the accelerator is released, the control valve 25 will energize the vacuum unit to disengage the clutch, the rocker arm then assuming the position shown in dotted lines.

Clutch disengaging movement of the rocker arm is transmitted to the shifter lever 60 by means of a bell crank 156, having a setscrew 157 arranged for adjustable contact with the rocker arm upon clutch disengaging movement thereof to transmit the movement to the bell crank. The upper end of the bell crank is connected to the shifter lever by means of a link 158 operable to move the shifter lever to gear uncoupling position when the bell crank is actuated. When the clutch is reengaged, the shifter lever is pulled to gear coupling position by means of the tension spring 133 which serves to hold the shifter lever in gear coupling position at all times except when the rocker arm is actuated for clutch disengagement.

The solenoid is in electrical connection with the selector lever in the previously described manner, adapting the solenoid to be energized upon lifting of the lever. The control valve is linked to the accelerator in the same way as before.

A separate application filed on October 11, 1939, as a division of this application and bearing Serial No. 298,995, contains claims directed to the structure herein disclosed for combined control of the motor, clutch and transmission.

Having described my invention, I claim:

1. In a transmission system, a clutch, speed change gears, a manually operated gear selector for selecting gears, a shifter lever for coupling the selected gears, a power operated device for controlling said clutch and having a yieldable connection to said shifter lever, means for holding said lever in gear coupling position, and operating means on said gear selector for releasing the shifter lever upon operation of the selector.

2. In a transmission, a power shaft, a clutch for connecting said transmission and power shaft, speed change gears in said transmission, a lever for selecting the gears to be coupled, a gear coupling lever, fluid operated means for declutching said clutch and moving said gear coupling lever in a gear uncoupling direction, and means operated by the selector lever for permitting the foregoing operations of the gear coupling lever and clutch.

3. In a transmission, a power shaft, gears to be coupled, a clutch for connecting said shaft to said gears, a lever for selecting the gears to be coupled, a gear changing lever, a fluid operated device for moving said gear changing lever in a gear uncoupling direction and declutching said clutch, a spring for moving said gear coupling lever into gear coupling position, and a magnetic latch controlled from said selector means for holding said lever in gear coupling position, said magnetic latch releasing said gear changing lever each time the selector lever is actuated for selecting the next gears to be coupled.

4. In a transmission, a source of power, a clutch for connecting said transmission to said source of power, said transmission including gears to be coupled, manual means for selecting the gears to be coupled, a gear coupling lever, power operated means for moving said gear coupling lever in a gear uncoupling direction and declutching said clutch, a spring for moving said gear coupling lever into gear coupling position, and electrically controlled means energized from said selector means, said electrically controlled means normally maintaining said lever in gear coupling position, said power operated means actuated for uncoupling the gears each time the manual means is actuated for selecting the gears to be coupled.

5. In a transmission system, a clutch, speed change gears, a manually operated gear selector, a power device for engaging and disengaging said clutch, a shifter lever yieldably connected to said power device for coupling and uncoupling said gears, an electrically operated locking device associated with said lever to lock the same normally in gear coupling position, and an electrical control connection between said locking device and said gear selector, whereby when said selector is operated for selecting gears, said locking device is energized to unlock said lever and permit the same to uncouple said gears.

6. In a transmission system, a clutch, speed change gears, means for selecting one of said gears, a shifter lever for coupling and uncoupling the same, a power device for controlling said clutch having a yieldable connecting member to said shifter lever for actuating the same, a locking device associated with said lever to lock the same in gear coupling position and manually operable means for unlocking said device to permit gear uncoupling movement of said lever when said power device is in clutch disengaging position.

7. In a transmission, a power source, a clutch for connecting said transmission and power source, speed change gears in said transmission, manual means for selecting the gear to be coupled, a gear coupling lever, fluid operated means for declutching said clutch and moving said gear coupling lever in a gear uncoupling direction, and electrical means controlled from the selector means for permitting the foregoing operation of the gear coupling lever.

8. A transmission system comprising a clutch controlled drive shaft, a speed change gear transmission driven by said drive shaft, a gear selector for said transmission, control means for engaging and disengaging said clutch, means for coupling and uncoupling the gears, said means being yieldable in gear uncoupling direction and connected to the clutch control means for actuation thereby, a locking device for locking the gears in coupled position and means on said gear selector for unlocking said locking device, whereby when the locking device is in locking position said clutch control means operates to disengage the clutch with the gears locked in coupled engagement, and actuation of the gear selector permits uncoupling of the gears prior to selecting the next gears.

9. In a transmission, a source of power, a clutch for connecting said transmission to said source of power, said transmission including gears to be coupled, manual means for selecting the gears to be coupled, a gear coupling lever, a power operated means for moving said gear coupling lever in a gear uncoupling direction and declutching said clutch, a spring for moving said gear coupling lever into gear coupling position, a slidable plunger adapted to be interposed in the path of movement of the lever, magnetic means controlled from said selector means for moving said plunger out of the path of movement of said lever each time the manual means is actuated for selecting the gear to be coupled.

10. In a transmission system, a clutch, speed change gears, a manually operated gear selector for selecting said gears, power means for disengaging the clutch and uncoupling the gears, a power operated shifter lever for uncoupling the gears, a spring for coupling the gears, electric means for controlling the movements of said lever, and a switch on said gear selector for energizing said electric means upon movement of the selector.

11. In a transmission, a source of power, a clutch for connecting said source of power to said transmission, said transmission including gears to be coupled, a selector lever for selecting the gears to be coupled, a gear coupling lever, a fluid motor for moving said gear coupling lever in a gear uncoupling direction and declutching said clutch, latching means controlled from said selector lever for holding said lever in gear coupling position and releasable each time the selector lever is actuated for selecting the gear to be coupled, compressible connecting means between the fluid motor and the gear coupling lever compressible when the latch is in position and effective when the latch is removed for uncoupling the gears, and spring means constantly urging the gear coupling lever in a gear coupling direction.

12. In a transmission, a source of power, a clutch for connecting said source of power to said transmission, said transmission including gears to be coupled, a selector lever for selecting the gears to be coupled, a gear coupling lever, power means for moving said gear coupling lever in a gear uncoupling direction and declutching said clutch, control means operated from said selector lever for maintaining said lever in gear coupling position and releasable each time the selector lever is actuated for selecting the gear to be coupled, means between the power means and the gear coupling lever effective through said control means for permitting engagement of the clutch and spring means constantly urging the gear coupling lever in a gear coupling direction.

13. In a transmission, a clutch for connecting said transmission to a source of power, gears to be coupled in said transmission, manual means for selecting the gears to be coupled, a gear coupling lever, a fluid motor for moving said gear coupling lever in a gear uncoupling direction and declutching said clutch, a spring for moving said gear coupling lever into gear coupling position and a magnetically controlled latching means normally holding said lever in gear coupling position and actuated for releasing the gear coupling lever each time the manual selector means is actuated for selecting the gear to be coupled.

14. A driving apparatus including, a clutch controlled power shaft, a clutch throwout lever and a gear shifting rod; a power operated device adapted to move said clutch throwout lever and translate said gear shifting rod in the named sequence, means for setting said gear shifting rod for selective gear shifting, means for retracting said rod and shifting said gears, and latching means controlled by the setting means for the gear shifting rod, said latching means normally holding the gear shifting rod in gear coupling position but releasable each time the gear shifting rod is reset for a gear change.

15. In a transmission, a power shaft, a transmission shaft, a propeller shaft, gears for coupling the transmission shaft and propeller shaft, an automatic centrifugally actuated clutch for connecting the power shaft to the transmission shaft, means for selecting gears to be coupled, means for coupling the gears including a lever, a power device for actuating said lever for uncoupling the gears, a spring for actuating the lever for coupling the gears, electric control means in the power device operated from the selector means for permitting uncoupling movement of the gear coupling lever and an interlocking device controlled by the clutch for locking the lever in gear uncoupling position while the clutch is still engaged.

16. In a transmission, a drive shaft, a clutch controlling said drive shaft, a propeller shaft, constantly meshing sets of speed change gears adapted to connect said drive shaft and said propeller shaft, shiftable coupling elements for connecting said sets of gears to said drive shaft, gear selecting means, a fluid motor for disengaging the clutch controlling the drive shaft and for disconnecting said gears from the drive shaft, an electrical control means for said fluid motor, said electrical control means energized by an initial movement of said gear selecting means and, spring means for reengaging the coupling elements and gears after a gear selection.

17. In a gear transmission, a drive shaft, a driven shaft, a clutch controlling said drive shaft, gears to be coupled for connecting said drive shaft and said driven shaft, manual means for selecting the gears to be coupled, a gear coupling lever, power operated means for declutching said clutch and moving said gear coupling lever in gear uncoupling position, a spring for moving said gear coupling lever into gear coupling position, a solenoid, and a toggle joint, said solenoid energized by an initial movement of said manual gear selecting means, said solenoid connected to the knee of said toggle joint to form a locking mechanism which normally operates to lock the clutch in engagement and the gears in coupled position, said solenoid operable to unlock the locking mechanism and permit clutch disengagement and gear uncoupling when the manual selector means is operated.

18. In a transmission, a power shaft, a propeller shaft, change gears including a countershaft for coupling the power shaft to the propeller shaft, driving means, a clutch for connecting said driving means to said power shaft, a manually operated selecting lever for selecting the gears to be coupled, a common actuator, a fluid motor, said common actuator operable by said fluid motor to disengage the clutch and uncouple the gears, a spring for reengaging the gears, a locking mechanism for normally locking said common actuator in clutch and gear engaging position, and a solenoid for operating said locking mechanism, said solenoid energized by an initial movement of said manual selecting lever, said locking means adapted to unlock the common actuator for clutch and gear disengagement by means of the fluid motor when the manual selecting lever is operated whereby the gears may be neutralized and another gear selected previous to being coupled by said spring.

19. In a transmission, a power shaft, a propeller shaft, a source of power, a clutch for coupling said source of power to said power shaft, gears for coupling the power shaft to the propeller shaft, a manual selecting lever for selecting the gears to be coupled, a fluid operated common actuator for disengaging the clutch and uncoupling the gears in proper sequence, a spring for reengaging the gears and, solenoid control means for said fluid operated common actuator, said solenoid control means energized by an initial movement of said manual selecting lever whereby the clutch is disengaged and the gears are uncoupled, a gear selection then made, and the gears reengaged by said spring.

PAUL W. NEFF.